United States Patent [19]
Levingston

[11] Patent Number: 5,776,293
[45] Date of Patent: Jul. 7, 1998

[54] JOINTS FOR POLYMERIC PIPE

[76] Inventor: Jerry C. Levingston, P.O. Box 1157, Steelville, Mo. 65565

[21] Appl. No.: 850,634

[22] Filed: May 2, 1997

Related U.S. Application Data

[63] Continuation of Ser. No. 380,838, Jan. 30, 1995, abandoned.

[51] Int. Cl.⁶ .................................................. B29C 65/02
[52] U.S. Cl. .......................... 156/304.6; 156/304.1; 156/309.6; 156/309.9; 156/499; 285/200; 285/382.4; 285/382.7
[58] Field of Search ........................ 156/293, 308.2, 156/309.6, 309.9, 304.1, 304.5, 304.6, 499, 580, 583.1; 285/200, 382.4, 382.5, 382.7

[56] References Cited

U.S. PATENT DOCUMENTS

| | | | |
|---|---|---|---|
| 2,240,319 | 4/1941 | Taylor | 29/157 |
| 3,466,738 | 9/1969 | Mount | 29/525 |
| 3,634,167 | 1/1972 | Plontke | 156/257 |
| 3,683,657 | 8/1972 | Davies | 72/112 |
| 3,691,617 | 9/1972 | Burnett | 29/423 |
| 3,737,362 | 6/1973 | Plontke | 156/580 |
| 3,986,240 | 10/1976 | Skinner | 29/157 T |
| 4,174,248 | 11/1979 | Carroll et al. | 156/538 |
| 4,277,091 | 7/1981 | Hunter | 285/55 |
| 4,447,076 | 5/1984 | Evans | 285/55 |
| 4,457,542 | 7/1984 | Shaefer et al. | 285/55 |
| 4,461,498 | 7/1984 | Kunsman | 285/16 |
| 4,514,244 | 4/1985 | Shaefer et al. | 156/305.5 |
| 4,521,041 | 6/1985 | Cox et al. | 285/156 |
| 4,537,426 | 8/1985 | Carter, Sr. | 285/110 |
| 4,708,374 | 11/1987 | Cox | 285/156 |
| 4,804,210 | 2/1989 | Hancock | 285/47 |
| 4,931,119 | 6/1990 | Watkins | 156/173 |
| 5,275,440 | 1/1994 | Esser | 285/16 |
| 5,410,131 | 4/1995 | Brunet et al. | 156/304.6 |
| 5,445,309 | 8/1995 | Yamada et al. | 156/304.6 |

OTHER PUBLICATIONS

Kidde-Fenwal, Inc., "Thermoswitch® Temperature Controller Installation Instructions," Dec. 1992.

Watlow, "Cartridge Heaters, Firerod Cartridge, Termination Options", pp. 95 and 109, date unknown.

*Primary Examiner*—James Sells
*Attorney, Agent, or Firm*—Senniger, Powers, Leavitt & Roedel

[57] ABSTRACT

A method for forming a branch in a pipe made of polymeric material which permits a strong joint to be formed at the branch to another pipe. A system for carrying out the method includes heaters which soften the polymeric material in a highly localized manner. A forming member is pulled through the softened material to deform the pipe wall and form a branch. A method for making reinforced pipe joints in which pipe sections are force fit into each other is also disclosed.

15 Claims, 7 Drawing Sheets

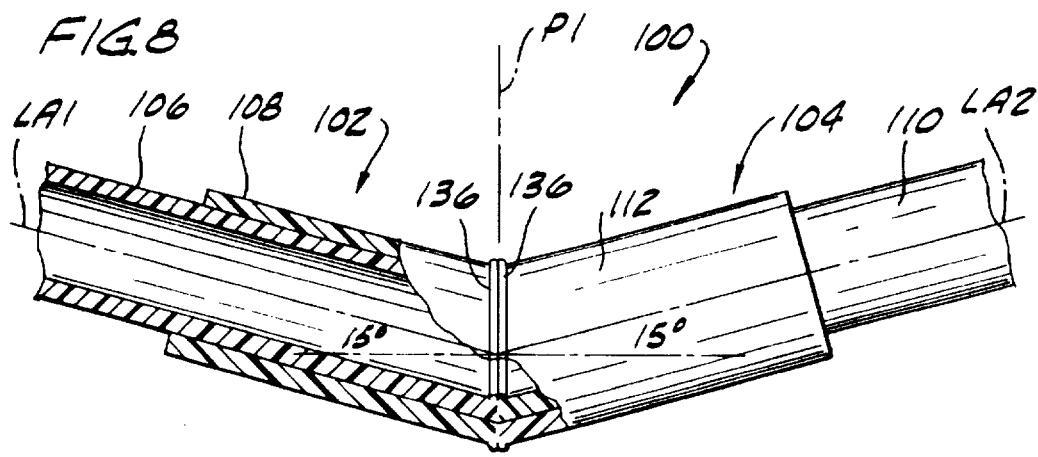
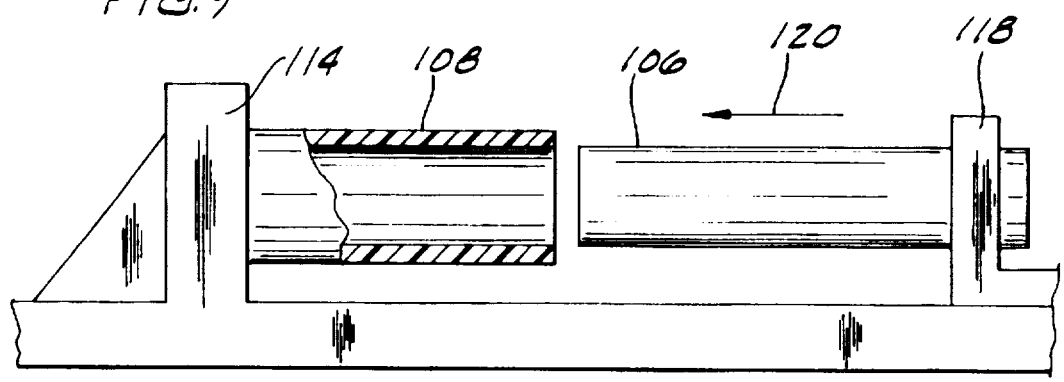
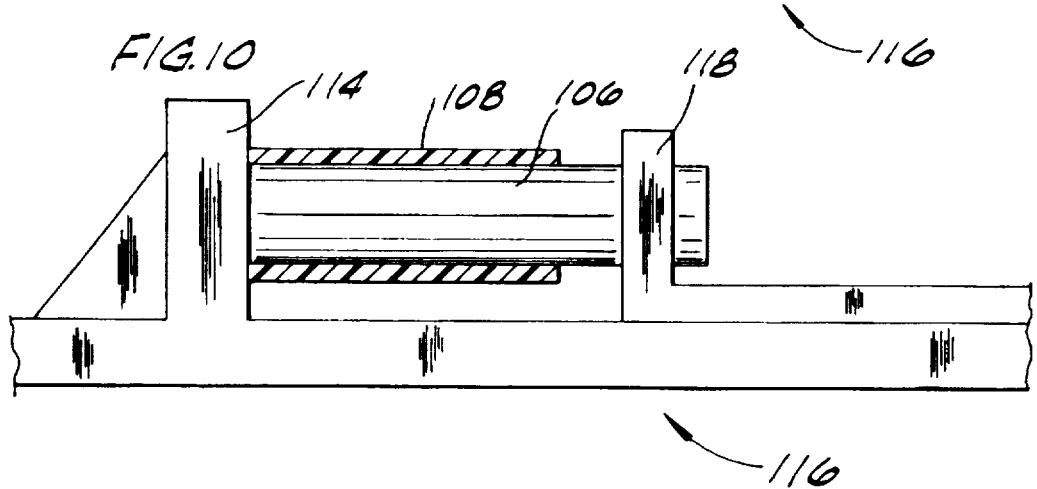

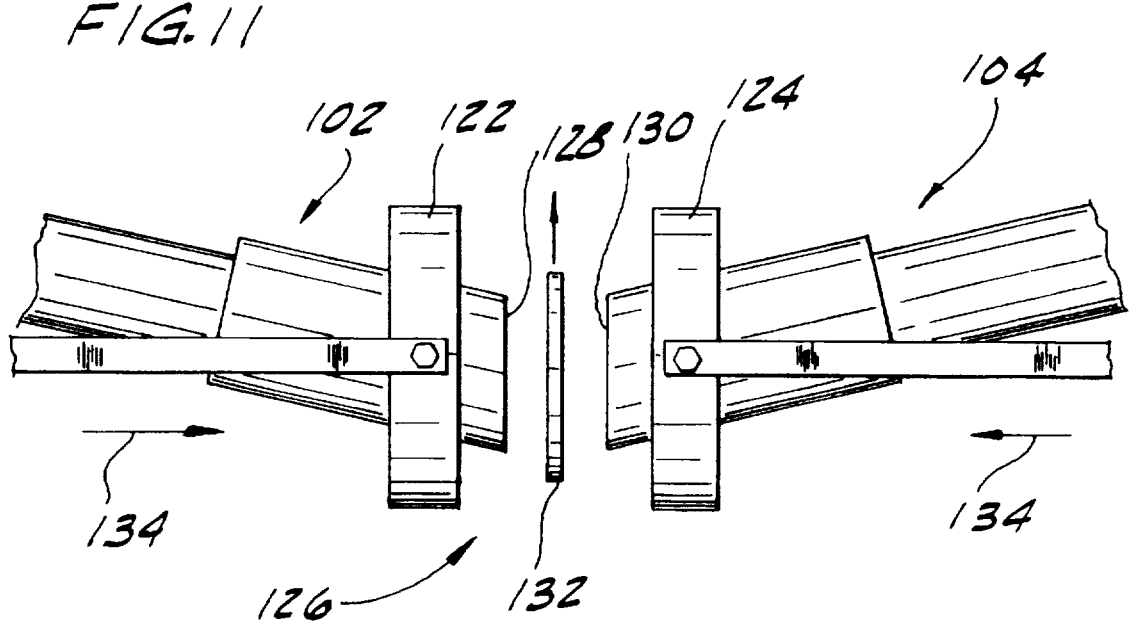

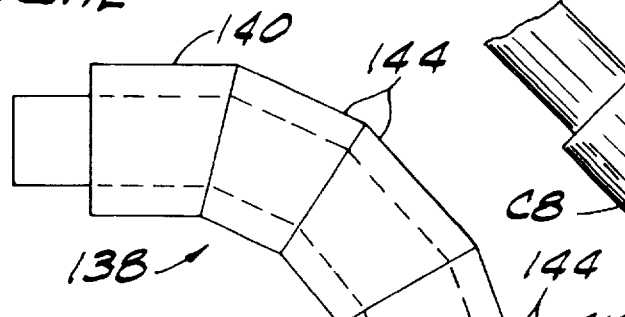
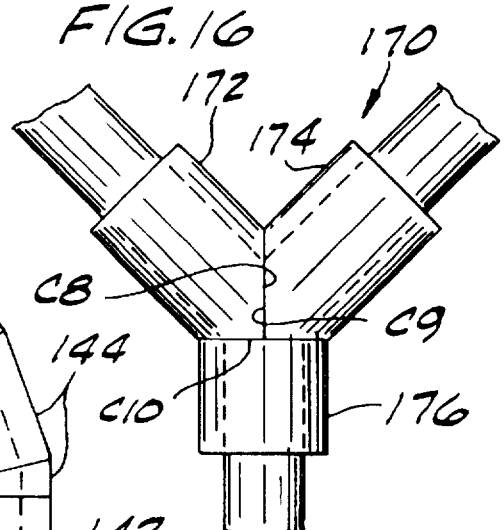
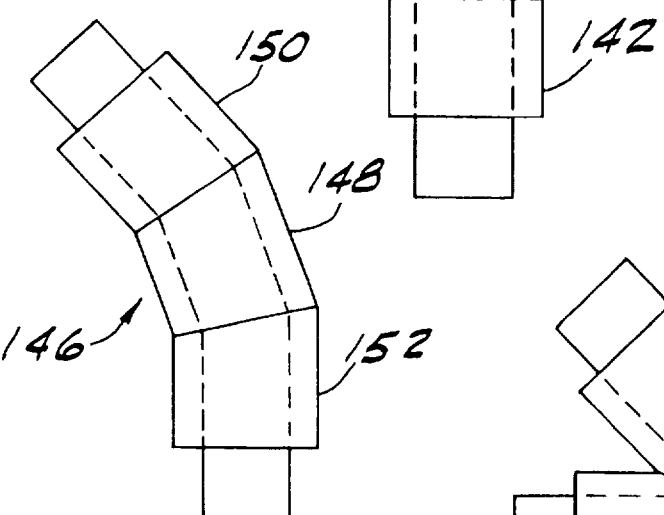
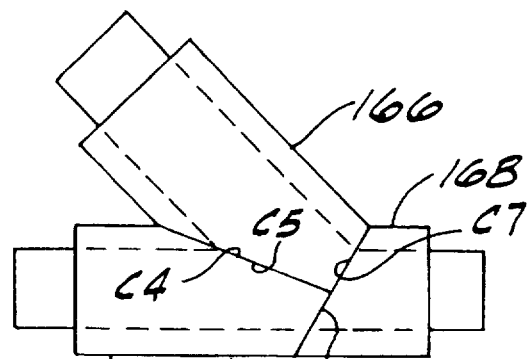
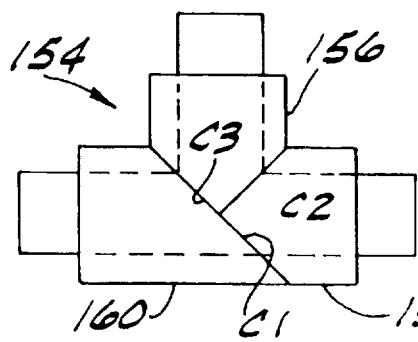
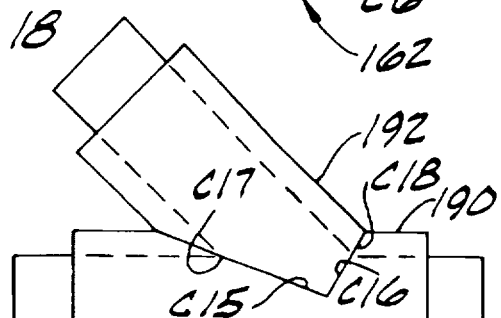
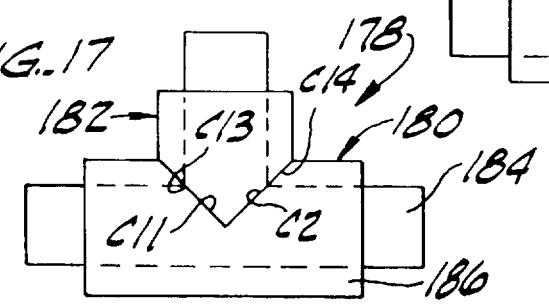

JOINTS FOR POLYMERIC PIPE

This is a continuation of application Ser. No. 08/380,838, filed Jan. 30, 1995, abandoned.

BACKGROUND OF THE INVENTION

This invention relates generally to joints for pipe of polymeric material and more particularly to such pipe joints which are used to change or provide an alternate direction of flow through the pipe.

The formation of joints in pipes presents several well-known problems, including the problem of weakness at the joint. The lack of strength may arise, among other reasons, because of the lack of an adequate surface on which to make the connection between the pipes being joined. A smaller diameter branch pipe coming off of a straight section of larger diameter main pipe which is approximately perpendicular to the longitudinal axis of the larger pipe (commonly known as a "reduced T"), presents a particular problem in providing an adequate joint. Presently, the joint between the branch pipe and main pipe is formed by cutting a V-shaped section out of the main pipe, and cutting one end of the branch pipe to a mating V shape sized for reception in the V-shaped opening in the main pipe. Connection of the branch pipe to the main pipe is achieved by welding the side wall of the branch pipe to the side wall of the main pipe. The side wall weld connection is much weaker than the joint connection between adjacent coaxial pipes.

It is also well known that pipes are subject to wear at locations where the pipe changes direction, particularly in applications where the material transported in the pipe is abrasive. Changes in direction are typically achieved by connection of a joint, which is curved or angled, between two pipe sections which are straight. Thus, the excessive wear occurs at the joint. It is known to reinforce the joint by adding additional thickness to the pipe in the joint. However, when the thickness is added on the interior of the pipe (e.g., by a liner) the internal cross section of the pipe is reduced causing an impediment to flow through the joint. The cost of producing special joints having increased thickness is substantial. It is not cost effective to produce a relatively small amount of pipe of increased thickness solely for the purpose of forming the joint.

SUMMARY OF THE INVENTION

Among the several objects and features of the present invention may be noted the provision of a method for forming a non-coaxial branch in a pipe which permits formation of a joint on the branch which is as strong as a joint between coaxial pipes; the provision of such a method which is used on pipe of polymeric material; the provision of such a method which employs the material of the pipe to form the branch; the provision of such a method which does not damage the pipe as the branch is being formed; and the provision of such a method which can be carried out expeditiously.

Further among the several objects and features of the present invention may be noted the provision of a system for carrying out the method for forming a branch in a pipe which applies heat only at the location where the pipe is to be deformed; the provision of such apparatus which forms the branch by pulling a forming member through the pipe; the provision of such apparatus which shapes the pipe material as it is deformed; and the provision of such apparatus which is easy to use.

Also among the several objects and features of the present invention may be noted the provision of a method for building up an angled, reinforced pipe joint which uses commonly available pipe sizes; the provision of such a method which can be carried out using standard equipment; the provision of such a method which requires little preparation to carry out; the provision of such a method which does not constrict the flow of material through the finished joint; the provision of such a method which increases the life of the joint when used under conditions where wear is likely to occur; and the provision of such a method which forms angled, reinforced pipe joints inexpensively.

Generally, a method for forming a branch in a pipe made of polymeric material includes the steps of applying heat to a portion of the exterior surface of the pipe wall, and applying heat to a portion of the interior surface of the pipe wall generally radially opposite to the exterior surface portion of the pipe wall to which heat is applied. The steps of applying heat are carried out for a sufficient period to render generally plastic the polymeric material in the pipe wall in a volume of the wall between said interior and exterior surface portions of the pipe wall. A forming member positioned in the interior of the pipe in the proximity of the interior surface portion of the pipe wall has a temperature less than the melting temperature of the polymeric material. The forming member is pulled through the plasticized volume of the pipe wall toward the exterior of the pipe. Polymeric material of the pipe which is displaced outwardly by the forming member as it is pulled through the volume is formed into the branch which is generally in the shape of a pipe section extending outwardly from the pipe wall.

In another aspect of the present invention, a system for forming a branch in a pipe made of polymeric material comprises fixture means for holding the pipe in a position. A first heater has a concave heating face shaped for engaging an exterior surface of the pipe wall over substantially the entire area of the heating face, and a second heater has a convex heating face shaped for engaging an interior surface of the pipe wall over substantially the entire area of the heating face. The first and second heaters are adapted to heat a volume of the pipe wall between the exterior and interior surfaces to make the material in said volume substantially plastic. A forming member sized for forming an inside diameter of the branch to be formed is adapted for connection to puller means for pulling the forming member through the volume generally from the interior of the pipe to the exterior of the pipe.

In still another aspect of the present invention, a method for forming a reinforced joint of polymeric material comprising the steps of selecting a first pipe section made of polymeric material, the first pipe section having an outer diameter and an inner diameter, and selecting a second pipe section made of polymeric material, the second pipe section having an inner diameter substantially corresponding to the outer diameter of the first pipe section. The first pipe section is forced longitudinally into the second pipe section, with the second pipe section expanding upon reception of the first pipe section therein and securely gripping the first pipe section thereby to form a first reinforced joint element. A third pipe section made of polymeric material is selected which has an outer diameter and an inner diameter, and a fourth pipe section made of polymeric material is selected which has an inner diameter substantially corresponding to the outer diameter of the third pipe section. The third pipe section is forced longitudinally into the fourth pipe section, the fourth pipe section expanding upon reception of the third pipe section therein and securely gripping the third pipe section thereby to form a second reinforced joint element. The first reinforced joint element is cut generally transversely in a plane which is skewed relative to the longitudinal axis of the first reinforced joint element so that the first reinforced joint element has a first end face lying generally in the plane. The first reinforced joint element is connected to the second reinforced pipe element thereby forming a reinforced joint which is angled.

Other objects and features of the present invention will be in part apparent, and in part pointed out hereinafter.

BRIEF DESCRIPTION OF THE DRAWINGS

FIG. 8 is an elevation of an angled, reinforced pipe joint of the present invention with parts broken away to show the interior construction;

FIGS. 9–10 diagrammatically illustrate the formation of reinforced pipe joint elements;

FIG. 11 is a diagrammatically illustrates the fusion of reinforced pipe joint elements; and FIGS. 12–18 show other angled, reinforced joints which may be formed using the method of the present invention.

Corresponding reference characters indicate corresponding parts throughout the several views of the drawings.

DETAILED DESCRIPTION OF THE PREFERRED EMBODIMENTS

Figure 1:
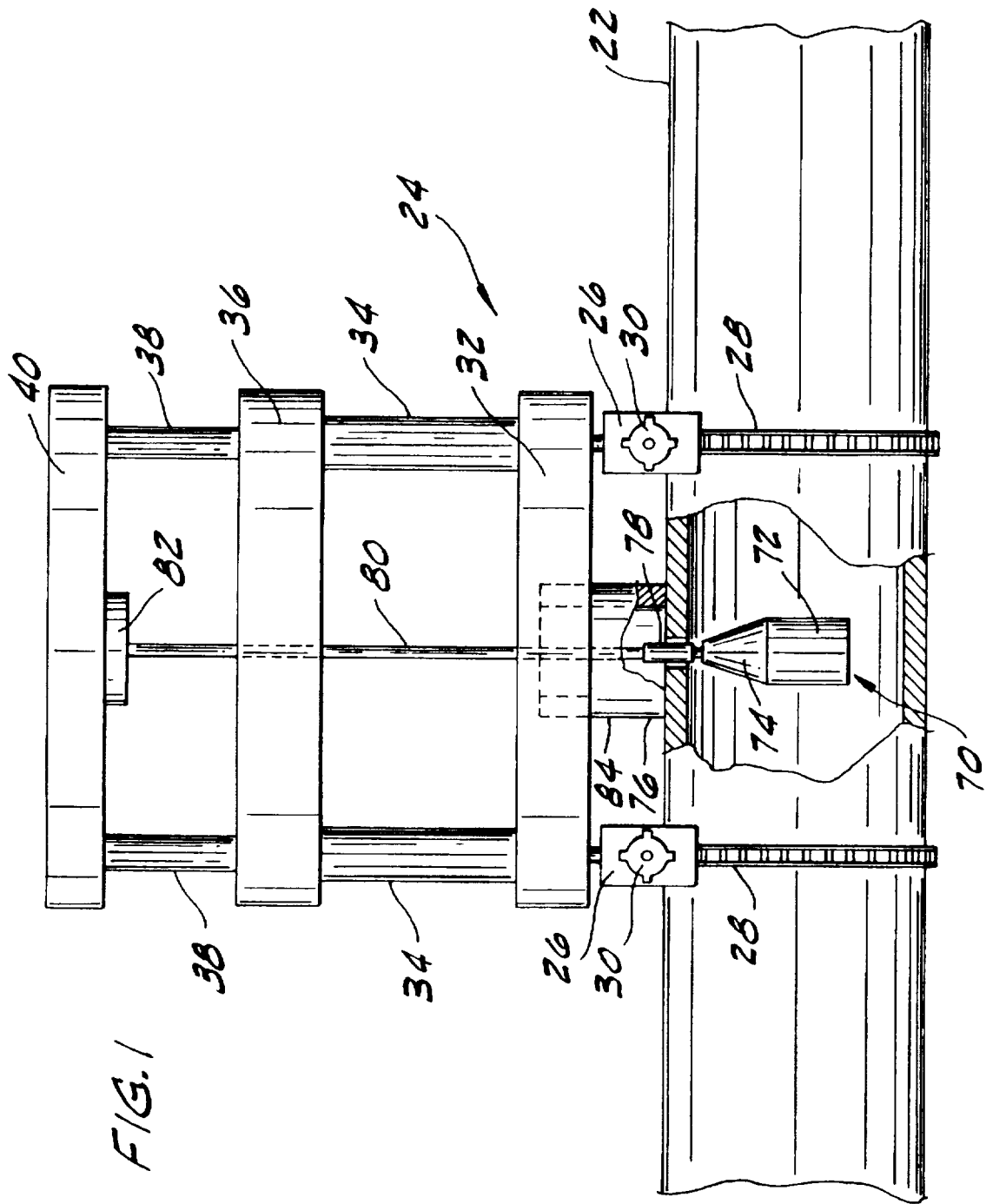
FIG. 1 is a schematic top plan view showing a system for forming a branch in a pipe of polymeric material, with parts of the pipe broken away.

Referring now to the drawings and in particular to FIGS. 1–3 and 7, a system for forming a branch 20 (FIG. 7) in a pipe 22 made of polymeric material such as high density polyethylene. As shown schematically in FIG. 1, a fixture indicated generally at 24 for holding the pipe includes a pair of frame posts 26, each having a chain 28 associated therewith which extends around the pipe 22 to hold the pipe securely against the frame posts. Knobs 30 at the top of the posts 26 are provided for adjusting the tension of the chains 28. A first clamp 32 is mounted on the posts 26 on the opposite side of the posts from the pipe 22. A pair of cylinders 34 extend from the first clamp 32 to a second clamp 36. The rods 38 of the cylinders 34 extend from the second clamp 36 to a third clamp 40 on the fixture 24. The third clamp 40 is movable by action of the cylinders 34 toward and away from the pipe 22.

Figure 2:
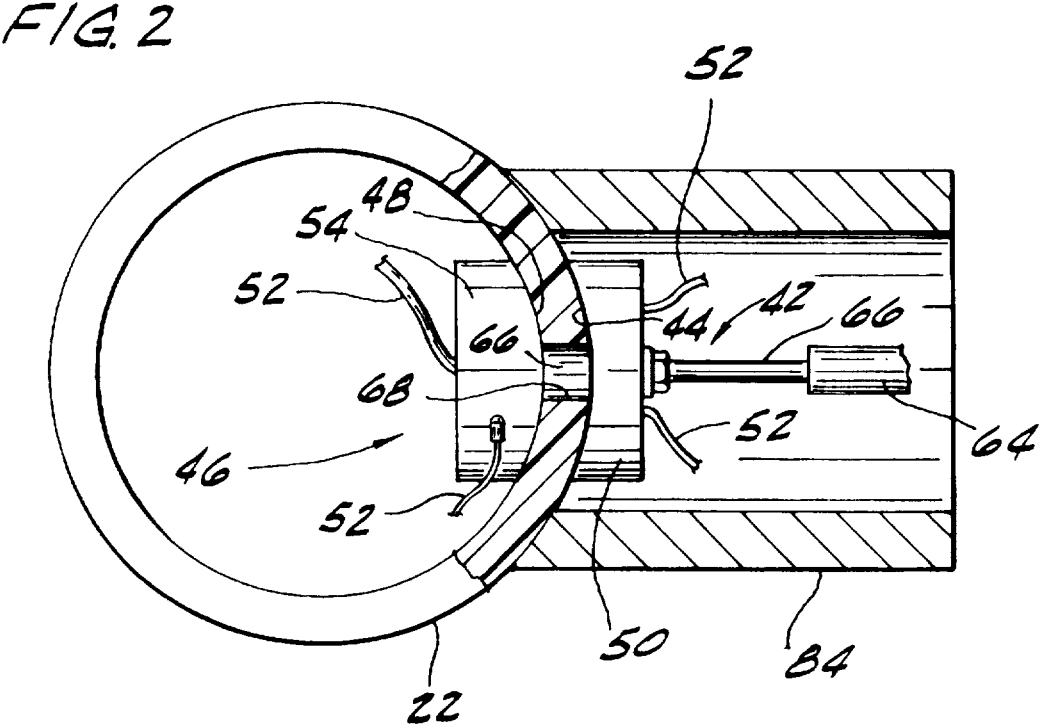
FIG. 2 is a schematic end elevation of the pipe showing a concave heater, a convex heater and a forming collar mounted thereon, with parts of the pipe and forming collar broken away to show the interconnection of the heaters.
Figure 3:
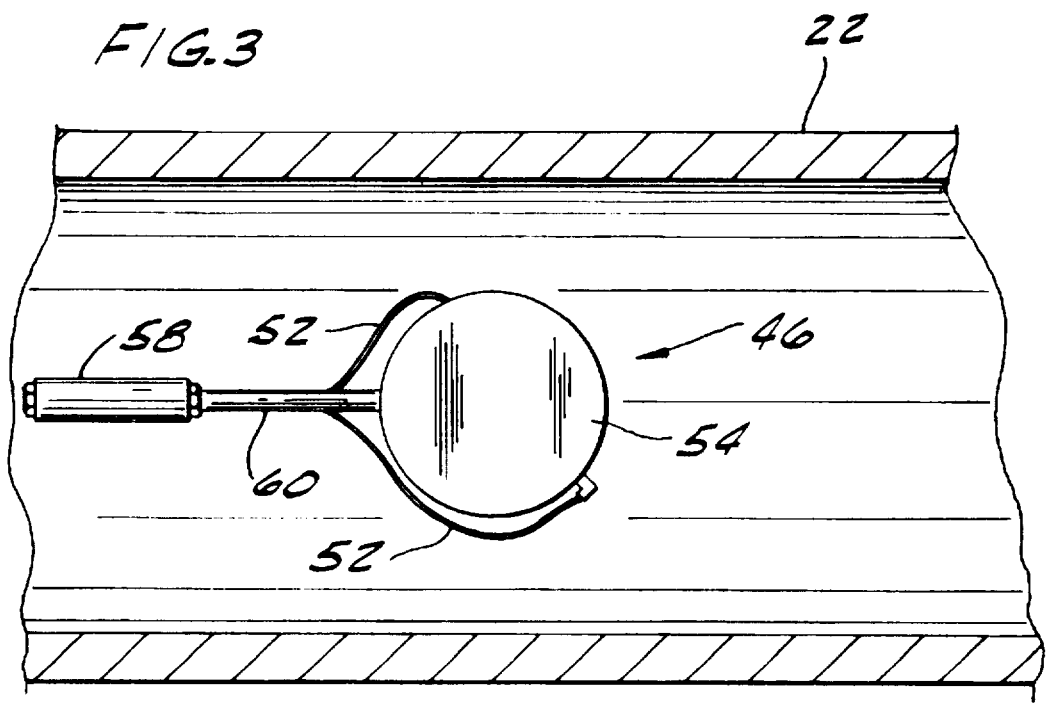
FIG. 3 is a longitudinal section of the pipe FIG. 2 showing the convex heater attached to an interior surface portion of the pipe wall.

Referring now to FIGS. 2 and 3, the system is shown to further comprise a concave heater (generally indicated at 42) having a concave heating face 44, and a convex heater (generally indicated at 46) having a convex heating face 48. The heating face of the concave heater 42 is sized for engaging an exterior surface of the pipe 22 over substantially the entire area of the heating face 44. Similarly, the heating face 48 of the convex heater 46 is shaped for engaging an interior surface of the pipe 22 over substantially the entire area of the heating face. The concave heater 42 comprises a body 50 made of a heat conducting material (e.g., aluminum) which is generally cylindrical in shape. Heating elements (not shown) are disposed in the body 50 for selectively heating the body. In a preferred embodiment, the heating elements are FIREROD cartridge heaters manufactured by Watlow of St. Louis, Mo. which are controlled by a Thermoswitch® temperature controller (not shown) manufactured by Kidde Fenwal of Ashland, Mass. Cords 52 extending from the heating elements connect them to the temperature controller and to a source of electricity. The convex heater 46 also has a body 54 containing heating elements controlled by the temperature controller. The convex heater 46 has a handle, generally indicated at 56, including an insulated grip 58 and a shaft 60 connecting the grip to the body 54 (FIG. 3). As shown in FIG. 2, a threaded handle 62 of the concave heater 42 includes an insulated grip 64 and a threaded shaft 66 which extends through the body 50, through a hole 68 in the pipe 22, and into a threaded opening (not shown) in the heating face 48 of the convex heater 46. Thus, the threaded handle 62 is capable of mounting the concave and convex heaters 42, 46 on the pipe 22 as shown in FIG. 2.

As shown in FIG. 1, the system further includes a bullet, generally indicated at 70, having a cylindrical body 72 sized for forming an inside diameter of the branch 20, and a tapered, generally conical nose 74 at one end of the bullet. A threaded stud 76 on the end of the conical nose 74 is capable of connection in a connecting sleeve 78 at one end of a puller rod 80 which extends from the connecting sleeve to a member 82 clamped in the third, movable clamp 40. The cylinders 34 and third clamp 40 constitute "puller means" in the illustrated embodiment. As described more fully below, the cylinders 34 may be activated to pull the bullet 70 from the interior of the pipe 22 through the pipe wall to the exterior of the pipe for forming the branch 20.

Figure 6:
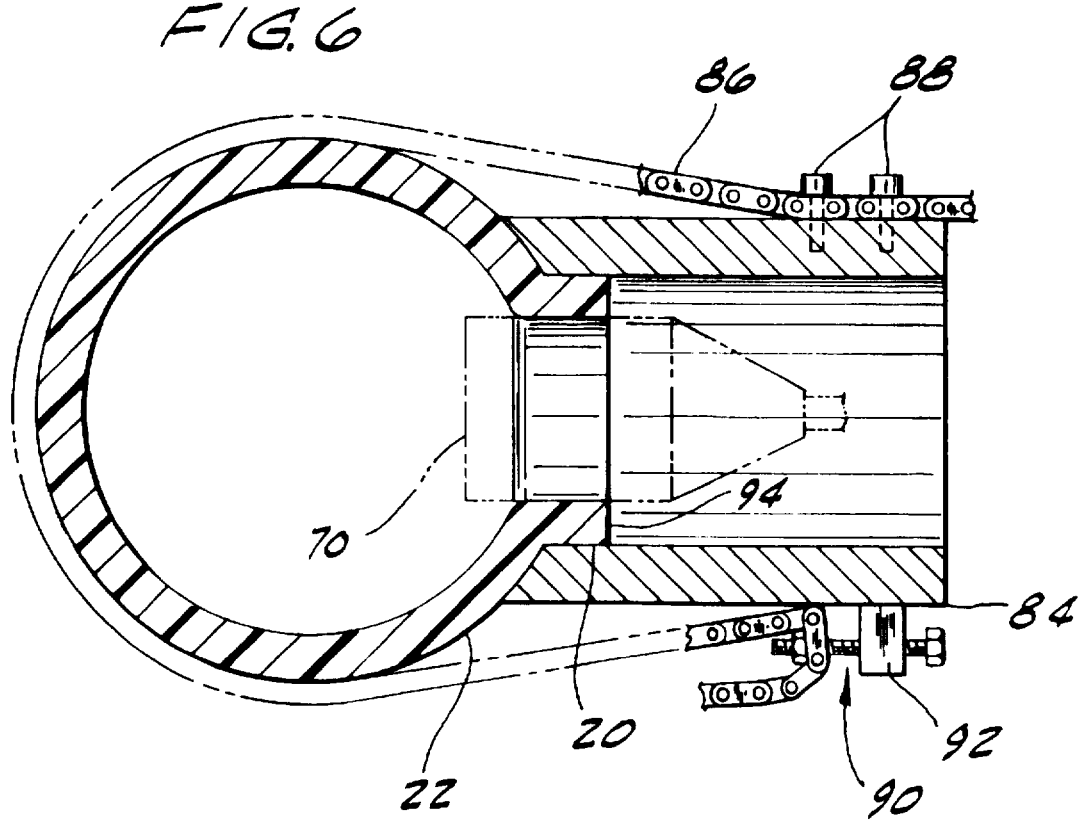
FIG. 6 is a cross section of the pipe and forming collar showing the forming member in phantom in its final position.
Figure 7:
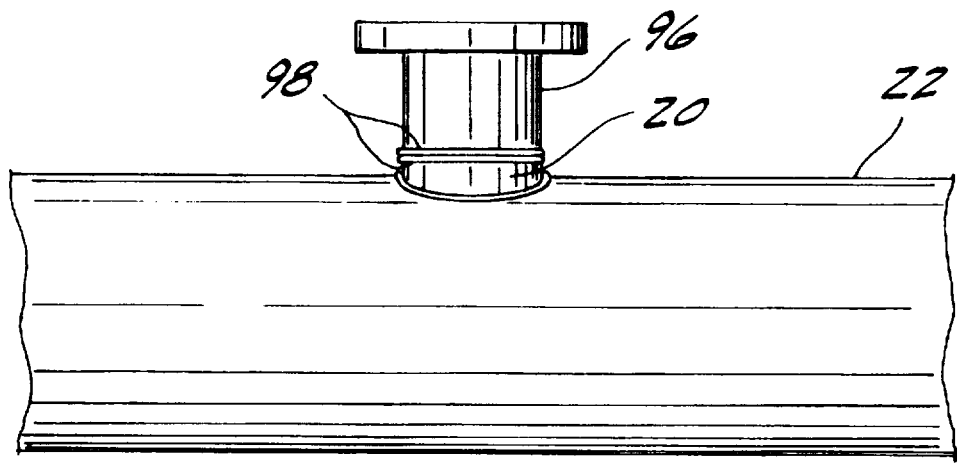
FIG. 7 is a fragmentary elevation of the pipe having a T joint.

Referring now to FIGS. 1 and 6, a tubular forming collar 84 is mounted on the exterior surface of the pipe 22 generally around the area through which the bullet 70 is to be pulled. As shown in FIG. 6, the collar 84 is mounted on the pipe 22 by a chain 86 fixedly attached by bolts 88 on one side of the collar and by an adjustable tensioning nut and bolt (indicated collectively by reference numeral 90) mounted on a tab 92 on the opposite side of the collar. The tensioning nut and bolt 90 may be used to tighten the chain 86 around the pipe 22 for holding the collar 84 in a fixed position on the pipe. The inner surface of the collar 84 is sized and shaped for forming the exterior surface of the branch 20 as the bullet 70 is pulled through the pipe wall and into the collar, as described in detail below.

A method for forming the branch 20, which is capable of being carried out with the system described above, includes the step of mounting the forming collar 84 on the pipe 22 using the chain 86 and nut and bolt 90, as described above. The method further includes the steps of applying heat to generally radially opposing portions of the exterior and interior surfaces of the pipe wall. As shown in FIG. 2, this is accomplished in the preferred embodiment by application of the concave and convex heaters 42, 46 to the pipe wall, the area of the opposing heating faces 44, 48 of the heaters contacting the pipe wall defining the portions of the exterior and interior surfaces to which heat is applied. It is to be understood that depending upon the diameter of a pipe and the size of a branch to be formed, concave and convex heaters (not shown) of different sizes would be employed. To mount the concave and convex heaters 42, 46 on the pipe 22, the hole 68 is drilled through the pipe at the center of the location where the branch 20 is to be formed. The concave heater 42 is received in the collar 84 with the shaft 66 of its threaded handle 62 inserted through the hole 68 in the pipe 22. The convex heater 46 receives the shaft 66 in the opening in its heating face 48 and is threaded into connection with the shaft. The heaters 42, 46 are drawn into clamping engagement with the pipe wall, as shown in FIG. 2, by turning the shaft 66 using the insulated grip.

The concave and convex heaters 42, 46 are preheated to a selected temperature (e.g., 300°–325° F.) prior to their application to the pipe 22. It is important to heat the polymeric pipe material in a volume between the exterior and interior surface portions for a sufficient period of time to render the material in the volume plastic. However, the pipe 22 should not be heated to the point where the material in the heated volume becomes tacky.

The heating is largely confined to the volume through which the bullet 70 will be pulled. It is not desirable for adjacent areas of the pipe 22 to become plastic, so the entire pipe is not heated to the point of becoming plastic. The time of heating depends upon the size of the branch to be formed and the thickness of the pipe wall. For example four inch diameter pipe, having a wall thickness of one inch, has been heated at 300° to 325° for a period in preparation for pulling a one inch (I.D.) branch. Ten inch diameter pipe, having a wall thickness of 1.5 inches, has been heated at 300° to 325° for a period in preparation for pulling a four inch (I.D.) branch. The period of time for which heating occurs is dependent upon the starting temperature of the pipe 22. If the pipe 22 has been stored outside in cold weather, it will take longer to plasticize a volume of pipe than when the pipe is warm.

The concave and convex heaters 42, 46 are removed from the pipe 22 by unscrewing the threaded shaft 66 from the body 54 of the convex heater 46 and lifting the concave and convex heaters away using their insulated grips 64, 58. The member 82 at the end of the puller rod 80 is inserted between jaws of the third clamp 40 and clamped for movement with the third clamp. By operation of the cylinders 34, the rod 82 is brought toward the hole 68 in the pipe 22 and passes through the hole. The bullet 70 is positioned in the interior of the pipe 22 in the proximity of the portion of the interior surface which was heated by the convex heater 46. The stud 76 on the conical nose 74 of the bullet 70 is threaded into the connecting sleeve 78 at the end of the puller rod 80 opposite the member 82 as shown in FIG. 1.

Figure 4:
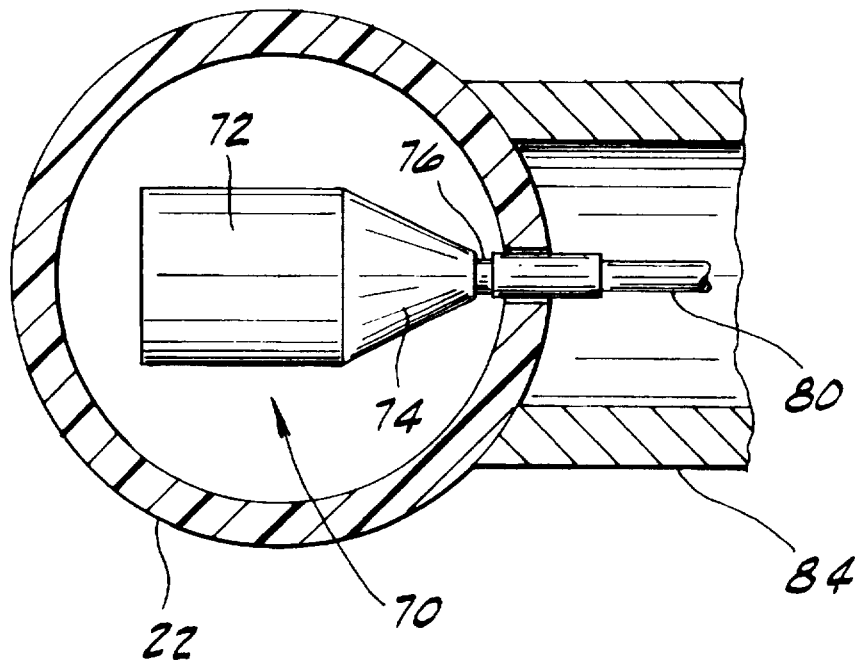
FIG. 4 is a schematic cross section of the pipe showing the forming member just prior to being pulled through the pipe.
Figure 5:
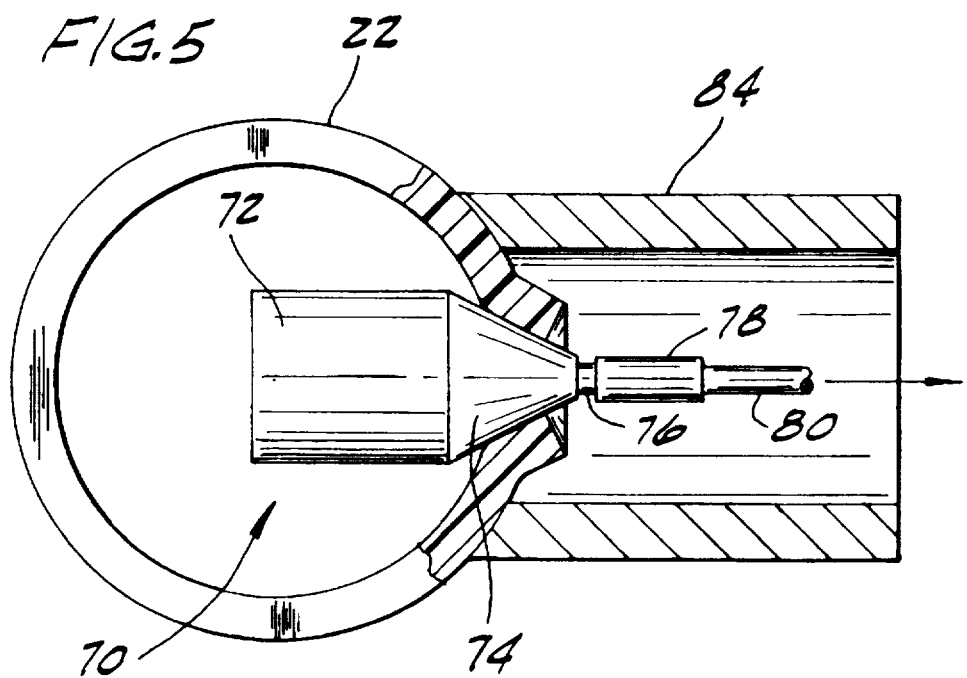
FIG. 5 is a schematic cross section of the pipe showing the forming member as it begins to be pulled through the pipe.

The steps of pulling the bullet 70 through the volume of the pipe wall plasticized by the heating of the concave and convex heaters 42, 46, and of forming polymeric material displaced outwardly by the bullet are schematically illustrated in FIGS. 4–6. The bullet 70 is preferably at a temperature less than the melting point of the polymeric material, more preferably at a temperature less than the glass transition temperature of the polymeric material, and most preferably the bullet is "cold", i.e., at the ambient temperature of the room in which the method is being carried out. From the initial position shown in FIG. 4, the bullet 70 is pulled outwardly as shown in FIG. 5, causing the polymeric material in the pipe wall to erupt outwardly around the hole 68. The conical nose 74 of the bullet 70 engages the material around the hole and gradually wedges it apart. As the bullet 70 is drawn into the collar 84 and the body 72 of the bullet passes through the pipe wall, the erupted polymeric material is pressed in the annular space between the body and the interior surface of the collar to shape the branch 20. In most cases, the body 72 of the bullet 70 has a diameter which is larger than the diameter of the desired inside diameter of the branch 20 to allow for a slight contraction of the inside diameter of the branch 20 when the bullet is removed. It is believed that where the pipe wall is relatively thin it may be necessary to undersize the bullet to allow for expansion of the branch opening. The bullet 70 is held in the position shown in FIG. 6 for a time selected to permit the heated polymeric material to cool sufficiently to generally hold its formed shape.

An annular, outwardly directed end face 94 of the branch 20 is illustrated in a finished (i.e., smooth, planar) form in FIG. 6 of the drawings. In practice, the end face 94 will be rough and/or non-planar, and is cut back after the bullet 70 and collar 84 are removed to achieve the finished end face. The provision of the planar end face 94 on the branch 20 is highly advantageous in that it provides an excellent surface for fusion to another pipe such as pipe joint section 96 shown in FIG. 8. Joining is preferably achieved by heating the end face of the branch 20 and an opposing end face (not shown) of the pipe joint section 96. The end face of the pipe joint section 96 is pressed against the end face 94 of the branch 20, fusing the branch and pipe joint section together over substantially the entire area of both end faces. The rolls 98 at the intersection of the branch 20 and the pipe joint section 96 are a result of the fusion process. The fusion produces a connection which is very strong, and at least not substantially weaker than the joint between the pipe 22 and another coaxial pipe (not shown).

Referring generally to FIGS. 8–18, and in particular to FIG. 8, an angled, reinforced pipe joint is indicated generally by reference numeral 100. The reinforced joint 100 is shown to comprise first and second reinforced joint elements (generally designated at 102 and 104, respectively) which are fused together at an angle (e.g., 30°). The first reinforced joint element 102 is made up of two pipe sections made of polymeric material such as polyethylene. A first pipe section 106 has an outer diameter and an inner diameter, and a second pipe section 108 has an inner diameter substantially corresponding to the outer diameter of the first pipe section. Similarly, the second reinforced joint element 104 includes a third pipe section 110 having an outer diameter and an inner diameter, and a fourth pipe section 112 having an inner diameter substantially corresponding to the outer diameter of the third pipe section. As may be seen in FIG. 8, the second and fourth pipe sections 108, 112 are disposed around mating end portions of the first and third pipe sections 106, 110, effectively increasing the thickness of the first and third pipe sections at and around the location of the turn in the joint 100.

The pipe joint 100 shown in FIG. 8 is preferably formed by selecting the first and third pipe sections 106, 110 from the same stock of pipe used in unreinforced form elsewhere in the pipe line. Thus, the inside diameter of the joint 100 will be the same as that of the pipe to which it is to be connected so that the joint does not constrict the flow. The second and fourth pipe sections 108, 112 are preferably selected so that their internal diameters are nominally the same as the external diameters of the first and third pipe sections 106, 110.

As shown in FIGS. 10 and 11, the second pipe section 108 is rigidly mounted on an anvil 114 of a press indicated generally at 116, and the first pipe section 106 is rigidly mounted on a ram 118 of the press generally coaxially with the second pipe section. The ram 118 is actuated by a hydraulic cylinder (not shown) to move in the direction indicated by arrow 120 in FIG. 9, thereby forcing the first pipe section 106 longitudinally into the second pipe section 108. It is to be understood that arrangement of the first and second pipe sections 106, 108 on the anvil 114 and ram 118 could be reversed without departing from the scope of the present invention. The second pipe section 108 resiliently expands upon reception of the first pipe section 106 and firmly grips the first pipe section within it. No modification of the first pipe section 106 or second pipe section 108 is made prior to their being forced together. For instance, it is unnecessary increase the internal diameter of the second pipe section 108 at one end by cutting or pre-expansion prior to forcing the first pipe section 106 into it. Similarly, no tapering or contraction of the leading end of the first pipe section 106 is needed.

The second reinforced joint element 104 is made from the third and fourth pipe sections 110, 112 in the same way as the first reinforced joint element 102.

In the illustrated embodiment, the first and second reinforced joint elements 102, 104 are each cut generally transversely in a plane which is skewed relative to the longitudinal axis of the respective reinforced joint element. As shown in FIG. 8, the reinforced joint elements have been cut in a plane P1 angled at approximately 15° from perpendicular to their longitudinal axes (designated LA1 and LA2, respectively). The cuts are made at the ends of the reinforced joint elements 102, 104 on which the reinforcing second and fourth pipe sections 108, 112 are mounted.

As shown in FIG. 11, the first and second reinforced joint elements 102, 104 are each clamped in a respective one of two clamps (designated 122 and 124, respectively) of a fixture indicated generally at 126 which may be substantially similar to the fixture 24 described above. The reinforced joint elements 102, 104 are positioned so that an end face 128 of the first reinforced joint element and an end face 130 of the second reinforced joint element, formed by the angled cuts in the reinforced joint elements, are parallel. A heating plate 132 is disposed between the end faces 128, 130 and cylinders (not shown) are activated to move the clamps 122, 124 in the directions indicated by arrows 134 to bring the end faces into engagement with the heating plate. The reinforced joint elements 102, 104 are pulled back when the end faces 128, 130 have become sufficiently heated for fusing together, and the heating plate 132 is removed. The cylinders are then reactivated to press together the end faces 128, 130 of the first and second reinforced joint elements 102, 104, thereby fusing the reinforced joint elements to form joint 100 shown in FIG. 8. The rolls 136 at the intersection of the first and second reinforced joint elements 102 are a result of the pressure applied to achieve fusion. It may be seen that the added thickness provided by the second and fourth pipe sections 108, 112 of the joint is located at and around the intersection of the first and second reinforced joint elements 102, 104 where material flowing through the joint is redirected. Thus, the increased thickness has been provided where there will be the greatest tendency to wear.

As shown in FIGS. 12–18, a number of angled, reinforced pipe joints may be formed using the same general techniques as described for making the joint shown in FIG. 8. A 90° joint is indicated generally by reference numeral 138 in FIG. 12. The 90° joint 138 comprises multiple reinforced joint elements including a first reinforced joint element 140, a second reinforced joint element 142 and other reinforced joint elements 144. The joint 138 is preferably made by starting with the first and second reinforced joint elements 140, 142 which are formed in the same way as the first and second reinforced joint elements 102, 104. The other reinforced joint elements 144 are formed by being cut away from one or both of the first and second reinforced joint elements 140, 142. Of course, the other reinforced joint elements 144 could each be formed in the same way as the first and second reinforced joint elements 140, 142 and still fall within the scope of the present invention. It is also envisioned that all elements of the joint could be cut from a single reinforced joint element (not shown). The angles of the cuts made are selected such that when the reinforced joint elements (140, 142, 144) are fused together, end face to end face, the joint 138 having a 90° bend is produced. It is to be understood that the number of reinforced joint elements used to build up a joint having a 90° bend may be greater or fewer than illustrated in FIG. 12 and still fall within the scope of the present invention. It will take more time to build up a joint having a large number of reinforced joint elements, but the greater the number of reinforced joint elements used, the smoother the turn inside the joint. A more gradual curvature reduces wear in the joint. Thus, the number of reinforced joint elements used to build up a joint will depend upon the particular application.

A 45° joint, generally indicated at 146 in FIG. 13, is made in substantially the same way as the 90° joint 138 of FIG. 12. As may be seen, only a single additional reinforced joint element 148 is used, in addition to a first reinforced joint element 150 and a second reinforced joint element 152, to form the joint 146.

Somewhat different types of joints which may be formed using the principles of the present invention are shown in FIGS. 14–16. More specifically, these joints employ multiple skewed angle transverse cuts to build up the desired T or Y joint. A T joint 154 shown in FIG. 14 includes three reinforced joint elements (designated 156, 158 and 160, respectively) which may be formed in substantially the same way as the first and second reinforced joint elements 102, 104 described above. However, only the third reinforced joint element 160 has a single cut C1 extending in a plane across the entire width of the reinforced joint element. The third reinforced joint element 160 is cut at an angle of 45° relative to its longitudinal axis. The first and second reinforced joint elements 156, 158 are preferably initially cut with a single, 45° cut C2 like the third reinforced joint element 160. These first and second reinforced joint elements 156, 158 are fused together in the same manner as the first and second joint elements 102, 104 described above, to form a 90° bend (not shown). The fused first and second reinforced joint elements 156, 158 are then cut along C3 across the cut C1 at a 45° angle to the longitudinal axis of each reinforced joint element. The fused first and second reinforced joint elements 156, 158 are then fused at the location of the cut C3 to the third reinforced joint element 160 to produce the T joint 154.

A lateral Y indicated generally at 162 in FIG. 15 is constructed in a very similar way to the T joint 154 shown in FIG. 14. Again, three reinforced joint elements (designated 164, 166, 168, respectively) may be formed in the same way as the first and second reinforced joint elements 102, 104. The first and second reinforced joint elements 164, 166 have cuts C4, C5 which are made at a relatively shallow angle relative to the longitudinal axes of the reinforced joint elements. The first and second reinforced joint elements 164, 166 are then fused together on the end faces formed by the cuts C4, C5. The fused first and second pipe joint elements 164, 166 have another cut C6 which is complementary to a cut C7 in the third reinforced joint element 168. The previously joined first and second reinforced joint elements 164, 166 are then fused to the third reinforced joint element 168 to form the lateral Y 162.

Construction of a true Y joint indicated generally at 170 in FIG. 16 also may begin with the formation of three reinforced joint elements (designated 172, 174, 176, respectively), each made in the same way as the first and second reinforced joint elements 102, 104. However, the third reinforced joint element 176 is not cut at all, or is cut only perpendicularly to its longitudinal axis. The first and second joint elements 172, 174 each have cuts (designated C8 and C9, respectively) at an angle of approximately 45° relative to their respective longitudinal axis. The first and second reinforced joint elements 172, 174 are fused together along the end faces formed by the cuts C8, C9. An additional cut C10 is made which is perpendicular to the intersection of the prior cuts C8, C9 at a location which produces an end face sized for engaging the end face of the third reinforced joint element 176. The fused first and second reinforced joint elements 172, 174 are then fused to the third reinforced joint element 176 to produce the true Y joint.

Referring now to FIGS. 17 and 18, different constructions of the T joint 154 of FIG. 14 and lateral Y joint 162 of FIG. 15 are shown. A T joint 178 is formed from two reinforced joint elements, designated 180 and 182, respectively. The first reinforced joint element 180 is formed by forcing a first reinforced pipe section 184 inside and partially through a second pipe section 186 so that the first pipe section extends longitudinally outwardly from both ends of the second pipe section. The method is substantially the same as described above for forming the first reinforced joint element 102. However, the anvil 114 would be modified to permit passage of the first pipe section 184 of the T joint 182 through the anvil. The first pipe section 184 may be forced into the second pipe section 186 by other methods and equipment without departing from the scope of the present invention.

A V-shaped opening is formed by two angled, intersecting, chordal cuts (designated C11 and C12) in the first reinforced joint element 180. An end of the second reinforced joint element 182 is cut at C13 and C14 to a V shape sized for reception in the V-shaped opening. The reinforced joint elements 180, 182 are then fused together to produce the T joint 178. Fusion may be accomplished by using a heating plate (not shown) having an angle corresponding to the angle of the V-shaped opening in the first reinforced joint element 180 and of the V-shaped end of the second reinforced joint element 182.

A lateral Y joint, generally indicated at 188 in FIG. 18, is also formed using only two reinforced joint elements (designated 190 and 192, respectively). The first reinforced joint element 190 may be formed in the same way as the first reinforced joint element 180 of the T joint 178. A laterally elongated, generally V-shaped opening is formed in the first reinforced joint element 190 by intersecting chordal cuts C15 and C16. The cut C15 is made at a much shallower angle than the cut C16, producing the elongation of the opening to the left (as viewed in FIG. 18). Corresponding cuts C17 and C18 are made in an end of the second reinforced joint element 192 so that the second reinforced joint element will fit into the elongated-V shaped opening in the first reinforced joint element 190. The first and second reinforced joint elements 190, 192 are fused together at the intersection of the joint elements formed by the cuts C15–C18. Another angled heating plate (not shown) may be used for the fusion process.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for forming a branch in a pipe made of polymeric material comprising the steps of:

applying heat to a portion of a cylindrical exterior surface of the pipe wall;

applying heat to a portion of a cylindrical interior surface of the pipe wall generally radially opposite to the exterior surface portion of the pipe wall to which heat is applied;

said steps of applying heat being carried out for a sufficient period to render generally plastic the polymeric material in the pipe wall in a volume of the wall between said interior and exterior surface portions of the pipe wall;

positioning a forming member in the interior of the pipe in the proximity of the interior surface portion of the pipe wall, the forming member having a temperature less than the melting temperature of the polymeric material;

pulling the forming member through the plasticized volume of the pipe wall toward the exterior of the pipe;

forming polymeric material of the pipe which is displaced outwardly by the forming member as it is pulled through the volume to form the branch generally in the shape of a pipe section extending outwardly from the pipe wall.

2. A method as set forth in claim 1 wherein the step of pulling the forming member through the plasticized volume of the pipe wall comprises the steps of:

drawing the forming member through the volume until an opening in the pipe wall having a size corresponding to the size preselected for the branch is formed;

holding the forming member in the pipe wall for a time selected to permit the heated polymeric material to cool sufficiently to generally hold its formed shape;

removing the forming member from the opening.

3. A method as set forth in claim 2 wherein the step of forming the polymeric material which is displaced by the forming member comprises the step of mounting a forming collar on the exterior surface of the pipe wall, and wherein the step of drawing the forming member through the plasticized volume of the pipe wall comprises the step of drawing the forming member into the collar with the displaced polymeric material located between the forming member and collar.

4. A method as set forth in claim 3 wherein the steps of applying heat to the exterior and interior surface portions of the pipe wall comprise the steps of applying a first heater having a concave heating face against the exterior surface portion of the pipe wall so that the heating face conforms to and is in substantially face-to-face engagement with the exterior surface portion, and applying a second heater having a convex heating face to the interior surface portion of the pipe wall so that the heating face conforms to and is in substantially face-to-face engagement with the interior surface portion.

5. A method as set forth in claim 4 wherein the forming member is generally at ambient temperature just prior to being pulled through the plasticized volume of the pipe wall.

6. A method as set forth in claim 1 wherein the steps of applying heat to the exterior and interior surface portions of the pipe wall comprise the steps of applying a first heater having a concave heating face against the exterior surface portion of the pipe wall so that the heating face conforms to and is in substantially face-to-face engagement with the exterior surface portion, and applying a second heater having a convex heating face to the interior surface portion of the pipe wall so that the heating face conforms to and is in substantially face-to-face engagement with the interior surface portion.

7. A method as set forth in claim 1 wherein the forming member is generally at ambient temperature just prior to being pulled through the plasticized volume of the pipe wall.

8. A method as set forth in claim 1 wherein the steps of applying heat to the exterior and interior surface portions of the pipe wall comprise the step of applying heat until the polymeric material in the volume between the exterior and interior surface portions is sufficiently soft to plasticly deform but is not tacky.

9. A method as set forth in claim 1 wherein the steps of applying heat to the cylindrical exterior and interior surface portions of the pipe comprise the steps of:

forming an opening through the pipe wall between the exterior and interior surface portions;

applying a first heater having a concave heating face against the exterior surface portion;

applying a second heater having a convex heating face against the interior surface portion;

interengaging the first and second heaters through the opening in the pipe wall.

10. A method as set forth in claim 9 wherein the step of interengaging the first and second heaters comprises the step of interconnecting the first and second heaters in clamping engagement with the exterior and interior surface portions of the pipe wall.

11. A system for forming a branch in a pipe made of polymeric material comprising:

fixture means for holding the pipe in a position;

a first heater having a concave heating face shaped for engaging a cylindrical exterior surface of the pipe wall over substantially the entire area of the heating face;

a second heater having a convex heating face shaped for engaging an interior surface of the pipe wall over substantially the entire area of the heating face, the first and second heaters being adapted to heat a volume of the pipe wall between the exterior and interior surfaces to make the material in said volume substantially plastic;

a forming member sized for forming an inside diameter of the branch to be formed;

puller means adapted for connection to said forming member for pulling the forming member through the volume generally from the interior of the pipe to the exterior of the pipe.

12. A system as set forth in claim 11 wherein further comprising a collar adapted for mounting on the exterior surface of the pipe wall, the collar being sized for receiving the forming member therein and for shaping polymeric material displaced from the pipe wall by the forming member to form an exterior surface of the branch.

13. A system as set forth in claim 12 wherein the forming member has a tapered leading end and a body adjacent the tapered end, the body being sized to form the inside diameter of the branch.

14. A system as forth in claim 13 wherein the body has a diameter larger than the inside diameter of the branch to be formed by the forming member.

15. A system as set forth in claim 11 further comprising a connector for interconnecting the first and second heaters through an opening in the pipe wall extending between the exterior and interior surfaces, the connector being capable of holding the first and second heaters in clamping engagement with the exterior and interior surfaces of the pipe wall.

* * * * *